(12) United States Patent
Kang et al.

(10) Patent No.: US 7,663,109 B2
(45) Date of Patent: Feb. 16, 2010

(54) MOBILE CANTILEVER DOOR-TYPE CONTAINER INSPECTION SYSTEM

(75) Inventors: Kejun Kang, Beijing (CN); Zhiqiang Chen, Beijing (CN); Qitian Miao, Beijing (CN); Yuanjing Li, Beijing (CN); Nan Jiang, Beijing (CN); Hua Peng, Beijing (CN); Xuewu Wang, Beijing (CN); Jinning Liang, Beijing (CN); Shangmin Sun, Beijing (CN); Zhizhong Liang, Beijing (CN); Quanwei Song, Beijing (CN); Yucheng Wu, Beijing (CN); Yanjun Han, Beijing (CN); Guang Yang, Beijing (CN); Bin Hu, Beijing (CN); Jingyu Gu, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 11/955,711

(22) Filed: Mar. 12, 2008

(65) Prior Publication Data
US 2008/0156992 A1      Jul. 3, 2008

(30) Foreign Application Priority Data
Dec. 14, 2006      (CN) .................. 2006 1 0165220

(51) Int. Cl.
G01F 23/00      (2006.01)
G01N 23/04      (2006.01)
H05G 1/02      (2006.01)
(52) U.S. Cl. .................. 250/359.1; 378/57; 378/198
(58) Field of Classification Search .............. 250/359.1, 250/358.1, 360.1, 306, 336.1; 378/57, 198
See application file for complete search history.

(56) References Cited

U.S. PATENT DOCUMENTS 5,065,418 A  *  11/1991  Bermbach et al. ............. 378/57

(Continued)

FOREIGN PATENT DOCUMENTS

CN      19991026240      12/1999

(Continued)

OTHER PUBLICATIONS

Russian Office Action in RU 2007145752 dated May 14, 2009.

*Primary Examiner*—David P Porta
*Assistant Examiner*—Faye Boosalis
(74) *Attorney, Agent, or Firm*—Marshall, Gerstein & Borun LLP

(57) ABSTRACT

The present invention discloses a mobile cantilever door-type container inspection system, in the art of radiation scanning imaging inspection technology. The system according to the present invention comprises a moveable scanning apparatus formed by a scanning frame and a remote control device, wherein the scanning frame comprises a radiation source and some detectors, wherein the radiation source or an apparatus cabin wherein the radiation source is disposed is connected with an L-shaped cantilever structure to form a door-type scanning frame, wherein beneath the radiation source or the apparatus cabin wherein the radiation source is disposed are provided with rollers that can reciprocatingly move on rails and are controlled by drive means. The detectors are disposed in a cross beam and a vertical beam of the cantilever structure of the door-type scanning frame. Rays of the radiation source are right in alignment with rows of detectors in the cantilever structure. The container truck to be inspected can pass through the door-like frame formed by the door-type scanning frame. Due to the cantilever structure, the inspection system is advantageous in stable operation, good-quality images, and high reliability.

20 Claims, 2 Drawing Sheets

U.S. PATENT DOCUMENTS

| | | |
|---|---|---|
| 6,563,903 B2 | 5/2003 | Kang et al. |
| 6,843,599 B2 * | 1/2005 | Le et al. .................... 378/198 |
| 6,920,197 B2 * | 7/2005 | Kang et al. .................. 378/57 |
| 7,302,035 B2 * | 11/2007 | Hu et al. ...................... 378/57 |
| 7,483,510 B2 * | 1/2009 | Carver et al. ................ 378/57 |
| 2002/0136353 A1 | 9/2002 | Kang et al. |
| 2004/0125914 A1 | 7/2004 | Kang et al. |
| 2004/0141584 A1 | 7/2004 | Bernardi et al. |
| 2004/0247075 A1 | 12/2004 | Johnson et al. |
| 2007/0110215 A1 * | 5/2007 | Hu et al. ...................... 378/57 |

FOREIGN PATENT DOCUMENTS

| | | |
|---|---|---|
| CN | 00103342.5 | 3/2000 |
| CN | 1392955 | 1/2003 |
| RU | 2251683 | 5/2005 |
| RU | 2261465 | 9/2005 |
| SU | 1301119 | 8/1988 |
| SU | 1551253 | 3/1990 |
| WO | WO-0227306 | 4/2002 |

* cited by examiner

MOBILE CANTILEVER DOOR-TYPE CONTAINER INSPECTION SYSTEM

CROSS-REFERENCE TO RELATED APPLICATIONS

This application claims the benefit of Chinese patent application No. 200610165220.5, filed Dec. 14, 2006.

TECHNICAL FIELD

The present invention relates to radiation scanning imaging inspection technology, particularly to a moveable cantilever door-type container inspection system.

BACKGROUND ART

In order to deal with increasingly rampant terrorism activities worldwide, all nations are striving to strengthen security inspection of goods imported and exported, particularly of container trucks. Terrorists often smuggle dangerous articles such as explosives, guns or the like through seaports or the Customs and so on, which causes a great threat to a nation's security. The above phenomena can be avoided to a large extent by means of detection of a radiation scanning imaging system. The inspection system of this kind is characterized in that a special scanning device emits rays for radiation scanning of a container truck to be inspected, the scanning device is equipped with a radiation source and some detectors, and in that the container truck is scanned by the scanning device which reciprocatingly moves. The rays emitted from the radiation source pass through the container truck to detectors, the detectors reflects density distribution of the inspected article according to changes of ray strength and converts ray strength into image gray scale so as to obtain transmission images of the container truck to be inspected.

In the prior art, the radiation imaging systems of this kind are in the following forms: fixed type, combined moveable type and vehicular moveable type. The present invention is a combined mobile radiation imaging system. According to the present applicant's applications for Chinese patent, for example, the application No. 00103342.5 "Detachable combined moveable container detecting apparatus" and application No. 99126240.9 "Combinable moveable container detecting system", a door-like structure straddling both sides of the container truck to be inspected is provided with a radiation source and detectors, wheels are provided on bottom of the two legs of said door-like structure, said wheels are driven by drive means to allow the scanning device to reciprocatingly move to accomplish scanning. In practical engineering application, this arrangement has the following drawback: since the door-like structure straddling both sides of the container truck to be inspected spans a large distance, which calls for a relatively high requirement for rigidity of the whole of the scanning device and causes great difficulty to design and manufacture of the scanning device. There is a need to improve the overall rigidity of the scanning device. Meanwhile, the large spanning distance makes it very difficult for the wheels on both sides to synchronously run during the whole scanning device operates so that the whole scanning device cannot stably operate and radiation imaging will be affected. Besides, since the mounting structure on the detectors side is provided with wheels underneath, vibration between the wheels and the steel rails affects quality of images.

SUMMARY OF THE INVENTION

To overcome the above drawbacks in the above prior art, an object of the present invention is to provide a moveable cantilever door-type container inspection system. It is improved and designed as a cantilever structure on basis of the original door-like structure so that the inspection system is advantageous in stable operation, good-quality images, and high reliability.

To achieve the above object of invention, the technical solution of the present invention is accomplished in the following manner:

A mobile cantilever door-type container inspecting system, comprising a moveable scanning apparatus formed by a scanning frame and a remote control device, wherein the scanning frame comprises a radiation source or an apparatus cabin wherein the radiation source is disposed and detectors, the scanning frame forms a door frame through which a container truck to be inspected can pass, beneath the radiation source or the apparatus cabin wherein the radiation source is disposed is provided with engaging means that can reciprocatingly move on at least one rail and are controlled by drive means, wherein the radiation source or the apparatus cabin wherein the radiation source is disposed is connected with a cantilever structure to form a door-type scanning frame, and the detectors are disposed in a cross beam and a vertical beam of the cantilever structure of the door-type scanning frame so that the detectors in the cantilever structure of the door-type scanning frame can receive the rays from the radiation source.

In the mobile cantilever door-type container inspecting system, the engaging mean beneath the radiation source or the apparatus cabin wherein the radiation source is disposed reciprocatingly move on two rails.

In the mobile cantilever door-type container inspecting system, the middle portion of the cross beam of the door-type scanning frame is supported by a vertical support.

In the mobile cantilever door-type container inspecting system, the engaging mean provided at the bottom ends of the radiation source or the apparatus cabin wherein the radiation source is disposed and said vertical support have the same spanning distance as that of the two rails and match said rails.

In the mobile cantilever door-type container inspecting system, a collimator is disposed in the vertical support.

In the mobile cantilever door-type container inspecting system, said engaging means are rollers.

In the mobile cantilever door-type container inspecting system, said drive means is an electrical machine drive means or hydraulic motor drive means.

In the mobile cantilever door-type container inspecting system, said radiation source utilizes a rectilinear electron accelerator or isotope.

In the mobile cantilever door-type container inspecting system, said cantilever structure is L-shaped.

Due to the above configuration and the cantilever structure used at the outer side of the rail, the present invention effectively reduces the spanning distance of the door-type structure, substantially lower requirement for rigidity of the scanning device so that design and manufacture of the scanning device is made easier, and greatly improves reliability of the system. On account of reduction of spanning distance of the door-type structure, stability in operation of the whole scanning device can be considerably improved. Meanwhile, the detectors are mounted on one side of the cantilever structure so that the vibration between the wheels and the steel rails affects quality of images very little.

The invention is further explained below in conjunction with the drawings and modes of carrying out the invention.

BRIEF DESCRIPTION OF THE ACCOMPANYING DRAWINGS

MODES FOR CARRYING OUT THE INVENTION

Figure 1:
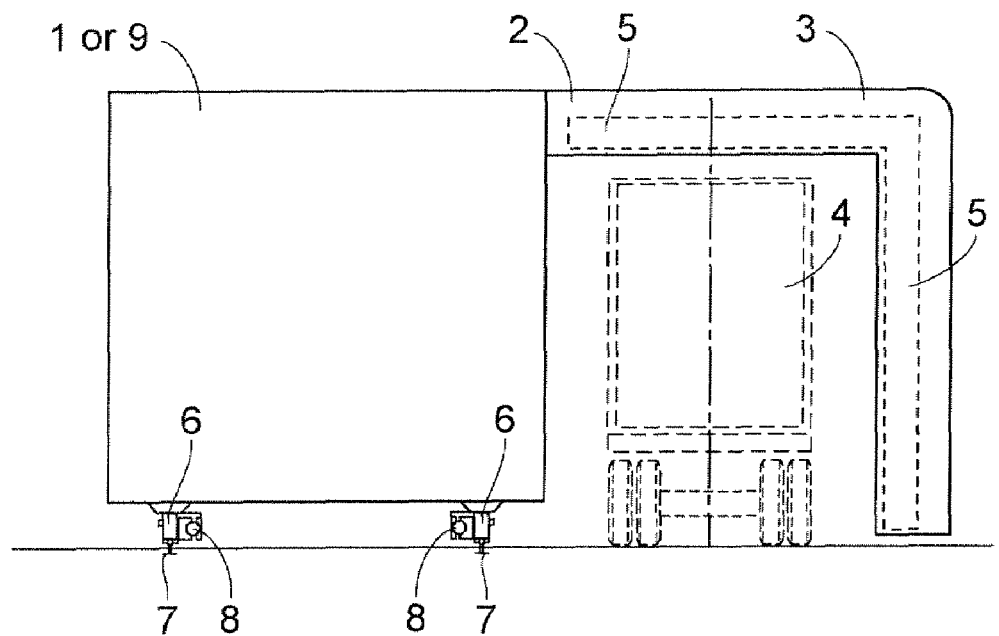
FIG. 1 is a schematic view of the structure of the present invention.

Referring to FIG. 1, the present invention comprises a mobile type scanning apparatus formed by a scanning frame and a remote control device (not shown), wherein the scanning frame comprises a radiation source 1 utilizing a rectilinear electron accelerator or isotope and detectors 5. A person skilled in the art can conceive other radiation sources. The radiation source 1 or an apparatus cabin 9 wherein the radiation source 1 is disposed and a cantilever structure 3 forms a door-type scanning frame 2, and the detectors 5 are disposed in the cantilever structure 3. At the bottom of the radiation source 1 or the apparatus cabin 9 wherein the radiation source 1 is disposed are provided with rollers 6 having the same spanning distance as that of two rails 7 and matching said rails. A person skilled in the art can conceive other engaging means matching said rails such that the radiation source 1 or the apparatus cabin 9 wherein the radiation source 1 is disposed can reciprocatingly move on the rails. Likewise, the number of rails is not limited to two. A person skilled in the art can conceive any number of rails that enables the radiation source 1 or the apparatus cabin 9 wherein the radiation source 1 is disposed to stably and reciprocatingly move on the rail(s), including one rail, two rails, three rails or more rails. The rollers 6 are controlled by a drive means 8 which is an electrical machine drive means or hydraulic motor drive means, or any other drive means conceivable by a person skilled in the art.

Figure 2:
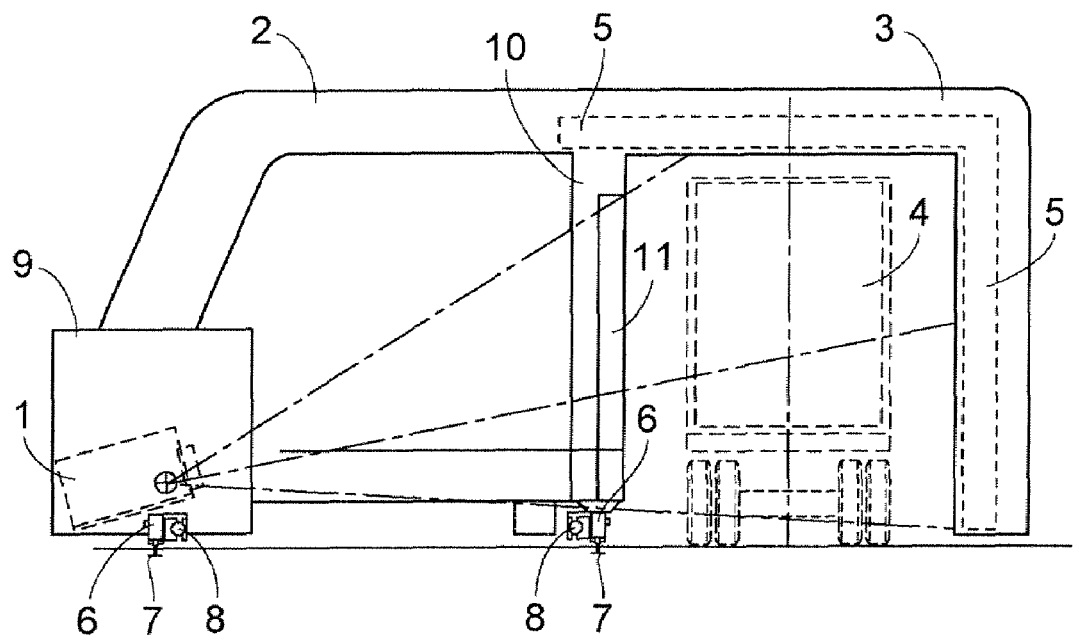
FIG. 2 is a schematic view of the structure of a preferred embodiment according to the present invention.
Figure 3:
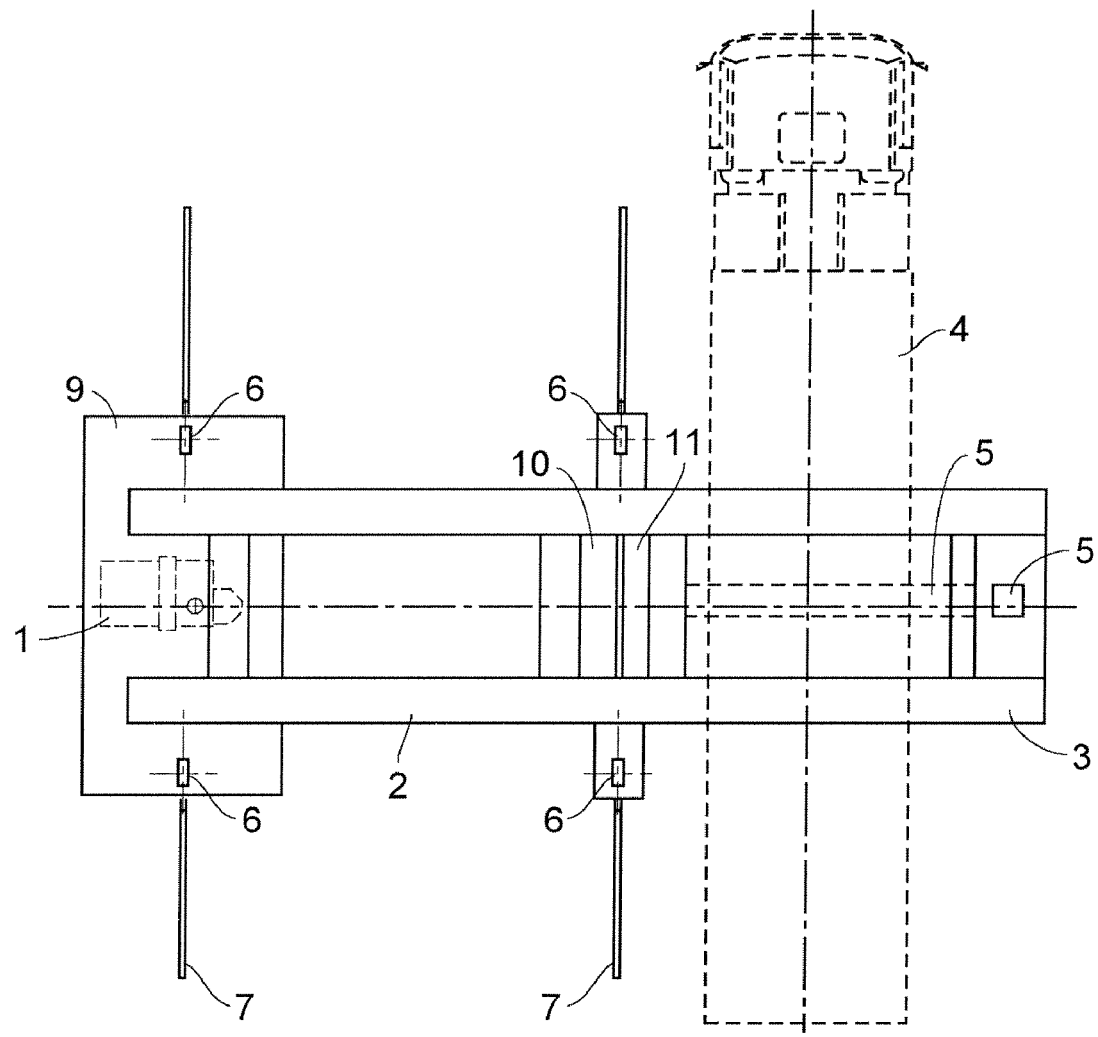
FIG. 3 is a top view of FIG. 2.

Referring to FIG. 2 and FIG. 3, in a preferred embodiment according to the present invention, the radiation source 1 is disposed in the apparatus cabin 9, the apparatus cabin 9 being connected to a bottom end of one side of door-type scanning frame 2. The middle portion of a beam of the door-type scanning frame 2 is supported by a vertical support 10. At bottom ends of the apparatus cabin 9 and the vertical support 10 are provided with rollers 6 having the same spanning distance as that of rails 7 and matching said rails. The rollers 6 are controlled by a drive means 8 which is an electrical machine drive means or hydraulic motor drive means. A collimator 11 is disposed in the vertical support 10. The detectors 5 are disposed in a cross beam and a vertical beam of the cantilever structure 3 of the door-type scanning frame 2. The rays from the radiation source 1, after passing through the collimator 11, come into alignment with the rows of detectors 5 in the cantilever structure 3 of the door-type scanning frame 2. A container truck 4 to be inspected passes through a door frame composed of the cantilever cross beam, the vertical beam of the door-type scanning frame 2 and the vertical support 10.

According to the present invention, in use, operation of the whole system is controlled by the remote control device. The rollers 6 at the bottom ends of the apparatus cabin 9 and the vertical support 10 are controlled to bring the whole scanning frame to reciprocatingly travel on and parallel to the rails 7 to realize scanning and inspection of the container truck 4 to be inspected passing through the door frame composed of the cantilever cross beam, the vertical beam of the door-type scanning frame 2 and the vertical support 10. The rays emitted from the radiation source 1 passes through the collimator 11, the container truck 4 to be inspected and to the detectors 5. The detectors output the acquired electrical signals, and then the remote control device acquires image data. All of these are of prior art and will not be described in detail herein.

The invention claimed is:

1. A mobile cantilever door-type container inspecting system, comprising:
    a moveable scanning apparatus formed by a scanning frame and a remote control device, wherein the scanning frame comprises a radiation source, or an apparatus cabin wherein the radiation source is disposed, and detectors, the scanning frame forms a door frame through which a container truck to be inspected can pass,
    beneath the radiation source, or the apparatus cabin wherein the radiation source is disposed, are engaging means that are reciprocatingly movable on at least one rail and are controlled by drive means,
    wherein the radiation source, or the apparatus cabin wherein the radiation source is disposed, is connected with a cantilever structure to form a door-type scanning frame, and the detector that is disposed in a cross beam and a vertical beam of the cantilever structure of the door-type scanning frame can receive the rays from the radiation source (1).

2. The mobile cantilever door-type container inspecting system according to claim 1, wherein the engaging mean beneath the radiation source, or the apparatus cabin wherein the radiation source is disposed, reciprocatingly moves on two rails.

3. The mobile cantilever door-type container inspecting system according to claim 2, wherein said engaging means comprises rollers (6).

4. The mobile cantilever door-type container inspecting system according to claim 2, wherein said drive means comprises one of an electrical machine drive means and a hydraulic motor drive means.

5. The mobile cantilever door-type container inspecting system according to claim 2, wherein said radiation source utilizes a rectilinear electron accelerator or isotope.

6. The mobile cantilever door-type container inspecting system according to claim 2, wherein said cantilever structure is L-shaped.

7. The mobile cantilever door-type container inspecting system according to claim 1, wherein the middle portion of the cross beam of the door-type scanning frame is supported by a vertical support.

8. The cantilever door-type container inspecting system according to claim 7, wherein the engaging means provided at the radiation source is disposed, and said vertical support have the same spanning distance as that of the two rails and match said rails.

9. The mobile cantilever door-type container inspecting system according to claim 8, wherein a collimator is disposed in the vertical support.

10. The mobile cantilever door-type container inspecting system according to claim 8, wherein said drive means comprises one of an electrical machine drive means and a hydraulic motor drive means.

11. The mobile cantilever door-type container inspecting system according to claim 7, wherein said engaging means comprises rollers.

12. The mobile cantilever door-type container inspecting system according to claim 8, wherein said radiation source utilizes a rectilinear electron accelerator or isotope.

13. The mobile cantilever door-type container inspecting system according to claim 8, wherein said engaging means comprises rollers.

14. The mobile cantilever door-type container inspecting system according to claim 7, wherein said drive means comprises one of an electrical machine drive means and a hydraulic motor drive means.

15. The mobile cantilever door-type container inspecting system according to claim 7, wherein said radiation source utilizes a rectilinear electron accelerator or isotope.

16. The mobile cantilever door-type container inspecting system according to claim 7, wherein said cantilever structure is L-shaped.

17. The mobile cantilever door-type container inspecting system according to claim 1, wherein said engaging means comprise rollers.

18. The mobile cantilever door-type container inspecting system according to claim 1, wherein said drive means comprises one of an electrical machine drive means and a hydraulic motor drive means.

19. The mobile cantilever door-type container inspecting system according to claim 1, wherein said radiation source utilizes a rectilinear electron accelerator or isotope.

20. The mobile cantilever door-type container inspecting system according to claim 1, wherein said cantilever structure is L-shaped.

* * * * *